United States Patent Office 3,290,392
Patented Dec. 6, 1966

3,290,392
ORTHO-ALKYLATED PHENOLS
George G. Ecke, Detroit, Mich., and Alfred J. Kolka, O'Hara Township, Allegheny County, Pa., assignors to Ethyl Corporation, New York, N.Y., a corporation of Virginia
No Drawing. Filed Nov. 12, 1963, Ser. No. 323,075
5 Claims. (Cl. 260—619)

This application is a continuation-in-part of our copending application Serial No. 801,998, filed March 26, 1959, and now abandoned, which in turn, is a continuation-in-part of application Serial No. 751,847, filed July 30, 1958, now U.S. Patent No. 3,075,832, which in turn is a continuation-in-part of application Serial No. 601,373, filed August 1, 1956, now abandoned.

The present invention deals in general with a novel class of compounds and their use as antioxidants. More particularly, this invention is concerned with a novel and unusual class of substituted phenolic compounds and the employment of these compounds as stabilizers and antioxidants for organic material.

It is the object of this invention to provide a novel class of chemical compounds. A further object of this invention is to provide novel compositions of matter comprising organic material stabilized against oxidative deterioration. A particular object of this invention is to provide high molecular weight unsaturated polymers of enhanced stability.

These and other objects are accomplished by a compound having the formula:

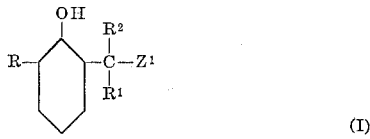

(I)

where R is an organic hydrocarbon radical having from 1 to about 22 carbon atoms, $R^1$ is an alkyl radical having from 1 to 3 carbon atoms, $R^2$ is selected from the group consisting of hydrogen and alkyl radicals having from 1 to 3 carbon atoms and $Z^1$ is an aromatic hydrocarbon radical having from 6 to about 12 carbon atoms. Examples of the compounds of this invention include:

2-tert-octyl-6-($\alpha$-ethyl-$\alpha$-methylbenzyl)phenol
2-sec-eicosyl-6-($\alpha$-methylbenzyl)phenol
2-($\alpha,\alpha$-diisopropyl-p-nonylbenzyl)-6-($\alpha,\alpha$-diisopropyl-p-ethylphenylbenzyl)phenol
2-tert-amyl-6-($\alpha,\alpha$-dimethylbenzyl)phenol
2-methyl-6-($\alpha$-ethylbenzyl)phenol
2-ethyl-6-($\alpha,\alpha$-diethyl-3-isobutylbenzyl)phenol
2-tert-butyl-6-($\alpha$-propyl-4-phenylbenzyl)phenol
2-isopropyl-6-($\alpha,\alpha$-dipropyl-3-hexylbenzyl)phenol
2-hexyl-6-($\alpha$-ethyl-$\alpha$-methylbenzyl)phenol
2,6-di-($\alpha,\alpha$-diethyl-4-methylbenzyl)phenol A preferred embodiment of this invention is a compound having the formula:

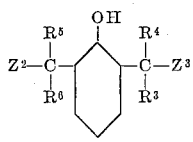

(II)

where $R^3$ and $R^5$ are alkyl radicals having from 1 to 3 carbon atoms, $R^4$ and $R^6$ are selected from the class consisting of hydrogen and the methyl group, and $Z^2$ and $Z^3$ represent aromatic hydrocarbon radicals having from 6 to about 12 carbon atoms. Among the compounds represented by this preferred embodiment are:

2,6-di-($\alpha,\alpha$-dimethylbenzyl)phenol
2,6-di-($\alpha$-ethyl-2-isopropylbenzyl)phenol
2,6-di-($\alpha$-methylbenzyl)phenol
2-($\alpha$-methylbenzyl)-6-($\alpha,\alpha$-dimethylbenzyl)phenol A particularly preferred embodiment of this invention consists of compounds of the above formula where $R^3$ and $R^5$ are methyl groups. Thus, 2,6-di-($\alpha$-methylbenzyl)phenol, 2,6-di-($\alpha,\alpha$-dimethylbenzyl)phenol and 2-($\alpha$-methylbenzyl)-6-($\alpha,\alpha$-dimethylbenzyl)phenol represent particularly preferred compounds of this invention. These compounds are preferred because of their unusual antioxidant activity and the fact that they are easily prepared from readily available starting materials.

Another preferred embodiment of this invention consists of those compounds in which R, in the formula first appearing above, is an alkyl group having from 1 to 4 carbon atoms, $R^1$ is hydrogen or a methyl group and $R^2$ is a methyl group. The particularly preferred alkyl groups represented by R are the methyl group, the isopropyl group and the tertiary butyl group. Examples of these preferred compounds are:

6-($\alpha$-methylbenzyl)-o-cresol
2-($\alpha,\alpha$-dimethylbenzyl)-6-tert-butylphenol
6-($\alpha,\alpha$-4-trimethylbenzyl)-o-cresol
2-($\alpha$-methyl-m-xylyl)-6-tert-butylphenol
6-($\alpha,\alpha$-3,4,5-pentamethylbenzyl)-o-cresol
2-isopropyl-6-($\alpha$-methyl-2-ethylbenzyl)phenol The compounds of this invention are readily prepared by reacting a phenol having a hydrogen atom on a carbon atom ortho to the hydroxyl group with an olefinic compound having an aromatic hydrocarbon radical bonded to one of the unsaturated carbon atoms in the presence of an aluminum phenoxide catalyst. For example, 6-($\alpha$-methylbenzyl)-o-cresol is conveniently prepared by reacting o-cresol with styrene in the presence of a small amount of aluminum o-cresoxide.

The temperatures employed in this reaction vary from about 50° C. to about 200° C. and reaction times of from ½ hour to 10 or more hours are profitably employed to give a good yield of product. The aluminum phenoxide catalyst may be prepared from the phenol employed in the reaction or from some other phenol. Thus, when the phenol itself is a reactant in the process, a small amount of aluminum o-cresoxide may be employed as the catalyst. However, the employment of a different phenol as catalyst leads to a small amount of contamination in the final product. To obtain the elevated temperatures sometimes necessary in this reaction, pressure may be resorted to. However, when reacting a phenol with most of the aromatic substituted olefinic compounds, atmospheric pressure is sufficient. The aromatic substituted olefins employed in the process of this invention can be considered derivatives of styrene. These compounds may be substituted in the aromatic ring and on both the alpha and beta carbon atom of the ethylene group. Substituents on the carbon atoms of the ethylene group contain up to 3 carbon atoms. However, styrene itself and $\alpha$-methylstyrene are preferred reactants.

When the phenol employed as a reactant is unsubstituted in the 2 and 6 positions, the resulting product is a 2,6-disubstituted phenol with some o-benzyl substituted phenol as a by-product. These latter compounds may be further reacted with olefins to form products of this invention. When the phenol employed is substituted in either the 2 or 6 position the process of this invention produces a compound having a benzyl group ortho to the hydroxyl group of the phenol by replacement of the available hydrogen.

The aluminum phenoxide catalyst may be prepared from aluminum metal and the phenol directly, or may be prepared by the reaction of an organic aluminum salt such as aluminum isopropoxide with the phenol. The process of this invention is more fully described in U.S. Patent 3,075,832.

The following examples illustrate the compounds of this invention and their preparation according to the method outlined above.

EXAMPLE I

To a reaction vessel equipped with a temperature measuring device, reflux condenser, means for temperature control and agitation means was charged 188 parts of phenol. The system was flushed with nitrogen, heated to 140° C. and 2.7 parts of aluminum were added in small portions over a 30 minute interval. During the aluminum addition, the temperature was maintained between 140° and 150° C. Over the next 30 minute period 208 parts of styrene were added. The temperature was allowed to increase and was controlled at between 180° and 185° C. This latter temperature range was maintained for an additional two hour period during which time the reaction mass was continuously under agitation. The reaction mixture was then cooled to room temperature and diluted with an equal volume of toluene. The mass was then washed first with dilute hydrochloric acid and then with water to hydrolyze and remove the aluminum. The toluene was then removed by distillation at atmospheric pressure. The subsequent distillation, under reduced pressure, yielded 124 parts of 2,6-di-($\alpha$-methylbenzyl) phenol boiling at 171–180° C. at 0.05–0.2 mm. Analysis calculated for $C_{22}H_{22}O$: C, 87.4 percent; H, 7.33 percent. Found on analysis: C, 87.2 percent; H, 7.28 percent.

EXAMPLE II

Phenol, 3 moles, was refluxed for 4 hours with 1/8 mole of aluminum turnings. Six moles of $\alpha$-methylstyrene were then added over a 5½ hour period at 150° C. At the end of the addition, the reaction temperature was maintained for 2 hours. The reaction mass was kept warm while 11.3 moles of benzene and 4.8 moles of diethyl ether were added to the reaction mixture to maintain all the solids in solution. Then approximately one mole of hydrochloric acid as a 10 percent aqueous solution was added. The organic phase was then separated and washed several times with warm water and separated by fractionation. The fractionation gave a 22.8 percent yield of o-($\alpha,\alpha$-dimethylbenzyl)phenol and a 36 percent yield of 2,6-di-($\alpha,\alpha$-dimethylbenzyl)phenol. Analysis of this latter product showed it to contain 86.7 percent carbon and 8.02 percent hydrogen. The calculated content for the compound is 87.2 percent carbon and 7.93 percent hydrogen.

The o-($\alpha,\alpha$-dimethylbenzyl)phenol recovered from the reaction is readily converted into compounds of this invention by reaction with an olefin in the presence of an aluminum phenoxide. Thus, for example, 2-($\alpha,\alpha$-dimethylbenzyl)-6-tert-butylphenol is prepared by the reaction of this compound with isobutylene. Similarly, the $\alpha$-methylbenzyl derivative and isopropyl derivative are prepared by reactions with styrene and propylene respectively.

EXAMPLE III

Two moles of redistilled o-cresol were refluxed for 8 hours with 1/8 mole of aluminum turnings to prepare the catalyst for the following reaction. After cooling the mixture to 150° C. 2 moles of styrene were gradually added. The reaction was exothermic and the temperature of the mixture rose to 220° C. After the styrene addition was completed the mixture was cooled to 100° C. and diluted with 2.36 moles of toluene. The catalyst was then hydrolized by the addition of 5.55 moles of water. Dilute hydrochloric acid was then added until a water phase separated. The organic phase was then drawn off and water washed to neutrality. Excess toluene was removed from the organic phase by distillation at 80° C. and 10 mm. of mercury. Distillation of the products yielded 1.23 moles of 6-($\alpha$-methylbenzyl)-o-cresol boiling at a maximum of 175° C. at 0.02 mm. of mercury.

EXAMPLE IV

Example III was repeated except that the styrene was added to the catalyst-o-cresol mixture at room temperature. 0.73 mole of 6-($\alpha$-methylbenzyl)-o-cresol were recovered from the reaction.

EXAMPLE V

Following the procedure of Example III, 2 moles of o-cresol containing 1/8 mole of aluminum cresoxide catalyst was alkylated with 2 moles of $\alpha$-methylstyrene. The $\alpha$-methylstyrene was added partially at 50° C. and the remainder at 150° C. The addition was followed by a 2 hour cook period at 150° C. The reaction mixture was cooled, diluted with benzene, washed successively with dilute hydrochloric acid, water, sodium bicarbonate, again with water and dried. The benzene was then stripped and the product purified by fractional distillation to yield 6-($\alpha,\alpha$-dimethylbenzyl)-o-cresol which boiled at from 139° to 142° C. at 0.35 mm.

EXAMPLE VI

Two moles of o-tert-butylphenol were reacted with 0.1 mole of aluminum isopropoxide by keeping the phenol under a nitrogen blanket and slowly adding the aluminum isopropoxide at 100 to 125°. Isopropanol was distilled from the reaction mixture. After the isopropanol was removed, 2 moles of styrene were slowly added to the reaction mixture over a 5 hour period. During the addition of styrene the reaction temperature was maintained at 125° C. After the styrene addition was completed the temperature was maintained at between 115 and 125° for a total of 21 hours. The reaction mixture was then hydrolized with 0.15 mole of concentrated hydrochloric acid in 1.4 moles of water and then diluted with benzene. The aqueous phase was removed and the organic phase filtered and washed with water to a final pH of between 4 and 5. The mixture was again filtered and the benzene removed by distillation. Fractionation of the remaining organic phase gave a 51 percent yield of 6-($\alpha$-methylbenzyl)-o-tert-butylphenol boiling at 110–120° C. at 0.02 mm. of mercury. The structure was confirmed by infra red analysis.

EXAMPLE VII

The procedure of Example VI is followed to prepare a mixture of o-tert-butylphenol and aluminum-o-tert-butylphenoxide. While maintaining the o-tert-butylphenol with the catalyst under a nitrogen blanket, 2 moles of $\alpha$-methylstyrene were added with agitation at 115 to 120° C. over a 5 hour period. Following the $\alpha$-methylstyrene addition, the reaction mixture was maintained at 120° C. with agitation for an additional 5 hours and 15 minutes. The reaction was then cooled, diluted with toluene, filtered and washed with dilute hydrochloric acid and filtered again. The organic phase was then washed three times with water and filtered through sodium sulfate. Atmospheric distillation removed the excess water and toluene. Distillation and reduced pressure gave a good yield of 2-($\alpha,\alpha$-dimethylbenzyl)-6-tert-butylphenol.

EXAMPLE VIII

From the o-($\alpha,\alpha$-dimethylbenzyl)phenol recovered from the reaction mixture of Example II, a compound 2-($\alpha,\alpha$-dimethylbenzyl)-6-tert-octylphenol is readily prepared by reaction with diisobutylene in the presence of an aluminum phenoxide.

EXAMPLE IX

Phenol is reacted with $\alpha,\beta$-diethyl-p-octyl styrene in the presence of a small amount of aluminum phenoxide as a catalyst. The reaction is conducted at about 200° C. for ten hours using the autogenous pressure of the system with toluene as a solvent. A good yield of 2,6-di-($\alpha$-ethyl-$\alpha$-propyl-p-octylbenzyl)phenol is recovered from the reaction mixture.

EXAMPLE X

Ortho-isopropylphenol, prepared by the reaction of phenol with propylene in the presence of an aluminum phenoxide catalyst, is reacted with styrene in the presence of an aluminum phenoxide catalyst to prepare an excellent yield of 2-($\alpha$-methylbenzyl)-6-isopropylphenol.

The compounds of this invention are outstanding antioxidants. Therefore, an embodiment of this invention is a new composition of matter which comprises organic material normally tending to undergo oxidative deterioration in the presence of air, oxygen or ozone, containing a small antioxidant quantity, up to about 5 percent, of a compound of this invention as described in Formulas I and II above. A preferred embodiment of this invention consists of organic material containing those compounds in which R in Formula I above is an alkyl group having from 1–4 carbon atoms. In this class of compounds, the particularly preferred compounds are those in which R is a methyl or tertiary butyl group. These compounds are particularly preferred since they tend to exhibit the most desirable properties and are readily prepared.

The compounds of this invention find important utility as antioxidants in a wide variety of oxygen sensitive materials. Thus, liquid hydrocarbon fuels such as gasoline, kerosene and fuel oil are found to possess increased storage stability by the use of an antioxidant of this invention. Likewise, liquid hydrocarbon fuels such as gasoline which contain organometallic additives such as tetraethyllead, as well as other organometallic compounds which are used as fuel additives, attain appreciably increased oxidative stability by the practice of this invention. In addition, lubricating oils and functional fluids, both those derived from naturally occurring hydrocarbons and those synthetically prepared, are greatly enhanced by the practice of this invention. The addition of small quantities of the compounds of this invention to such materials as turbine, hydraulic, transformer and other highly refined industrial oils; waxes, soaps and greases; plastics; synthetic polymers such as polyethylene and polypropylene; organometallic compositions such as tetraethyllead and tetraethyllead antiknock fluids; elastomers, including natural rubber; crankcase lubricating oils; lubricating greases; and the like, greatly increase their resistance to deterioration in the presence of air, oxygen or ozone.

The compounds of this invention are also very useful in protecting petroleum wax—paraffin wax and microcrystalline wax—against oxidative deterioration. They also find use in the stabilization of edible fats and oils of animal or vegetable origin which tend to become rancid especially during long periods of storage because of oxidative deterioration. Typical representatives of these edible fats and oils are linseed oil, cod liver oil, castor oil, soybean oil, rapeseed oil, coconut oil, olive oil, palm oil, corn oil, sesame oil, peanut oil, babassu oil, butter fat, lard, beef tallow, and the like.

The compounds of this invention are also very effective antioxidants for high molecular weight unsaturated hydrocarbon polymers, such as polybutadiene, methyl rubber, polybutene rubber, natural rubber, butyl rubber, GR–S rubber, GR–N rubber, piperylene rubber, dimethyl butadiene rubber and the like. Thus a preferred embodiment of the present invention is a rubber containing as an antioxidant therefor, a 2,6-di-substituted phenol as defined above. Another part of this invention is the method of preserving rubber which comprises incorporating therein a 2,6-di-substituted phenol of this invention as defined above. The stabilizer is incorporated into the rubber by milling, Banbury mixing, or similar process, or is emulsified and the emulsions added to the rubber latex before coagulation. In the various embodiments of this invention the stabilizer is used in small amounts, generally ranging from about 0.01 to about 5.0 percent, based on the rubber.

As used in the description and claims, the term "rubber" is employed in a generic sense to define a high molecular weight plastic material which possesses high extensibility under load coupled with the property of forcibly retracting to approximately its original size and shape after the load is removed. It is preferable that the rubber be a sulfur-vulcanizable rubber, such as India rubber, reclaimed rubber, balata, gutta percha, rubbery conjugated diene polymers and co-polymers exemplified by the butadiene-styrene (GR–S) and butadiene-acrylonitrile (GR–N or Paracril) rubbers and the like, although the invention is applicable to the stabilization of any rubber, high molecular weight organic material which is normally susceptible to deterioration in the presence of oxygen, air, or ozone. The nature of these rubbers is well known to those skilled in the art.

Among the definite advantages provided by this invention is that the present rubber compositions possess unusually great resistance against oxidative deterioration. Moreover, these compositions exhibit excellent non-staining and non-discoloration characteristics. Furthermore, the novel stabilizer is relatively inexpensive and easily prepared, and possesses the highly beneficial property of low volatility. As is well known, a highly desirable feature of a rubber antioxidant is that it have a low volatility so that it remains admixed with the rubber during vulcanization and related process steps.

The rubber compositions of the present invention are illustrated by the following specific examples wherein all parts and percentages are by weight.

EXAMPLE XI

To illustrate the enhanced oxygen resistance of the rubber compositions of this invention and their excellent non-staining and non-discoloration characteristics, a light-colored stock is selected for test. This stock had the following composition:

| | Parts by weight |
|---|---|
| Pale crepe rubber | 100.00 |
| Zinc oxide filler | 50.00 |
| Titanium dioxide | 25.00 |
| Stearic acid | 2.00 |
| Ultramarine blue | 0.12 |
| Sulfur | 3.00 |
| Mercaptobenzothiazole | 1.00 |
| | 181.12 |

To the above base formula is added one part by weight of 2,6-bis($\alpha$-methylbenzyl)phenol and individual samples are cured for 20, 30, 45 and 60 minutes at 274° C. using perfectly clean molds with no mold lubricant. Another set of samples of the same base formula which do not contain an antioxidant are cured under the same conditions.

To demonstrate the protection afforded to the rubber by the practice of this invention, the tensile strength and the ultimate elongation of stocks prepared by the addition of the inhibitor are determined before and after aging. These properties are also determined on the inhibitor-free stocks. The aging is accomplished by conducting the procedure of ASTM Designation: D–572–52, described in the ASTM Standards for 1952, Part 6, for a period of 168 hours at a temperature of 70° C. with an initial oxygen pressure in the test bomb of 300 p.s.i.g.

The tensile strength and the ultimate elongation of the test specimens before and after aging are measured by ASTM Test Procedure, D–412–51T (ASTM Standards for 1952, Part 6). The tensile strength is the tension load per unit cross-sectional area required to break a test specimen, while the ultimate elongation is the elongation at the moment of rupture of a test specimen. A decrease in the values for either of these properties upon aging represents a decrease in the usefulness of the article fabricated therefrom, so that the degree to which these properties are retained is a direct measure of the utility of the protective substance.

Measurements are also made of the increase in weight of the test specimens which occur during the accelerated aging. This is a direct measure of the oxygen up-take of the samples and provides another criterion of the effectiveness of an inhibitor in suppressing oxidative deterioration of the rubber. Thus, the larger the weight increase, the greater is the deterioration and the less effective is the inhibitor.

In all the above tests, the composition compounded with 2,6-bis($\alpha$-methylbenzyl)phenol gives results which show this additive to be an excellent antioxidant.

EXAMPLE XII

To a synthetic rubber master batch comprising 100 parts of GR–S rubber having an average molecular weight of 60,000, 50 parts of mixed zinc propionate-stearate, 50 parts of carbon black, 5 parts of road tar, 2 parts of sulfur and 1.5 parts of mercaptobenzothiazole is incorporated 1.5 parts of 6-($\alpha,\alpha$-dimethylbenzyl)-o-cresol. This batch is then cured for 60 minutes at 45 p.s.i. of steam pressure.

EXAMPLE XIII

Natural rubber stock is compounded according to the following formula:

| | Parts |
|---|---|
| Thick gristly crepe natural rubber | 100 |
| Wax | 2 |
| Ultramarine dye | 0.1 |
| Zinc oxide | 70 |
| Titanium dioxide | 20 |
| Sulfur | 3 |
| Stearic acid | 1.2 |
| 2,6-bis($\alpha,\alpha$-dimethylbenzyl)phenol | 1 |
| Benzothiazyl disulfide | 0.4 |
| Amine activator | 0.5 |

This stock is then vulcanized for 60 minutes at 280° F.

EXAMPLE XIV

A butadiene-acrylonitrile copolymer is produced from butadiene-1,3 and 32 percent of acrylonitrile. Two percent (based on the dry weight of the copolymer) of 6-($\alpha$-methylbenzyl)-o-cresol is added as an emulsion in sodium oleate solution to the latex obtained from emulsion copolymerization of the monomers. The latex is coagulated with a pure grade of aluminum sulfate and the coagulum, after washing, is dried for 20 hours at 70° C.

EXAMPLE XV

Three percent of 2,6-bis($\alpha$-methylbenzyl)phenol emulsified in sodium oleate is added to a rubber-like copolymer of butadiene-1,3 and styrene containing 25 percent of combined styrene.

EXAMPLE XVI

A rubber stock is compounded from 100 parts of smoked sheet rubber, 60 parts of zinc oxide, 20 parts of lithopone, 2 parts of sulfur, 0.7 part of diphenyl guanidine phthalate, 0.8 part of benzoyl thiobenzothiazole, 0.2 part of paraffin and 2 parts of 2-($\alpha,\alpha$-dimethylbenzyl)-6-tert-butylphenol. The stock so compounded is cured by heating for 45 minutes at 126° C. in a press.

EXAMPLE XVII

Two parts of 2-($\alpha$-ethyl-4-methylbenzyl)-6-ethylphenol are incorporated in 100 parts of raw butyl rubber prepared by the copolymerization of 90 percent of isobutylene and 10 percent of isoprene.

EXAMPLE XVIII

To 200 parts of raw butyl rubber prepared by copolymerization of 95 percent of isobutylene and 5 percent of butadiene is added 1.5 parts of 2-($\alpha$-propylbenzyl)-6-tert-amylphenol.

EXAMPLE XIX

To a master batch of GR–N synthetic rubber comprising 100 parts of GR–N rubber, 5 percent of zinc stearate, 50 parts of carbon black, 5 parts of road tar, 2 parts of sulfur and 2 parts of mercaptobenzothiazole is added 5 percent based on the weight of the batch of 6-($\alpha,\alpha$-dimethylbenzyl)-o-cresol.

EXAMPLE XX

To natural rubber (Hevea) is added 0.1 percent of 2,6-bis(methylbenzyl)phenol.

Each of the above illustrated rubber compositions of this invention possesses greatly improved resistance against oxidative deterioration as compared with the corresponding rubber compositions which are devoid of an antioxidant. Moreover, the light-colored stocks of the above examples exhibit virtually no discoloration or staining characteristics even when subjected to severe weathering conditions and the like. The methods of formulating the improved rubber compositions of this invention will now be clearly apparent to those skilled in the art.

The amount of stabilizer employed in the rubber compositions of this invention varies from about 0.01 to about 5 percent by weight based on the weight of the rubber. The amount used depends somewhat upon the nature of the rubber being protected and the conditions of service to be encountered. Thus, in the stabilization of natural and synthetic rubber to be used in the manufacture of tires which are normally subjected to exposure to the elements, as well as to the action of sunlight, frictional heat, stress and the like, the use of relatively high concentrations of this inhibitor is advantageous. On the other hand, when the article of manufacture is not to be subjected to such severe conditions, relatively low concentrations can be successfully utilized. Generally speaking amounts ranging from about 0.1 to about 3 percent by weight give uniformly satisfactory results.

Other rubbers and elastomers which can be preserved according to this invention are the rubbery polymerizates of isoprene, butadiene-1,3, piperylene; also the rubbery copolymer of conjugated dienes with one or more polymerizable monoolefinic compounds which have the capability of forming rubbery copolymers with butadiene-1,3, outstanding examples of such monoolefinic compounds being those having the group $CH_2=C<$, exemplified by styrene. Examples of such monoolefins are styrene, vinyl naphthalene, alpha methyl styrene, p-chlorostyrene, dichlorostyrene, acrylic acid, methyl acrylate, methyl methacrylate, methacrylonitrile, methacrylamide, methyl vinyl ether, methyl vinyl ketone, vinylidine chloride, vinyl carbazole, vinyl pyridines, alkyl-substituted vinyl pyridines, etc. In fact, excellent stabilization is achieved by incorporating a compound of this invention in any of the well known elastomers which are normally susceptible to deterioration in the presence of air, such as elastoprenes, elastolenes, elastothiomers, and elastoplastics.

As pointed out above, the compounds of this invention are effective antioxidants when added to other organic compositions normally tending to undergo deterioration in the presence of air, oxygen or ozone. The following examples illustrate various embodiments of this aspect of the invention.

EXAMPLE XXI

To a master batch of high molecular weight polyethylene having an average molecular weight of about 1,000,000, a tensile strength of 6,700 p.s.i., a Shore D hardness of 74 and a softening temperature under low load of 150° C. is added 5 percent of 2,6-bis($\alpha,\alpha$-dimethylbenzyl)phenol to prepare a composition of outstanding oxidative stability.

EXAMPLE XXII

A linear polyethylene having a high degree of crystallinity, up to 93 percent and below 1 ethyl branched chain per hundred carbon atoms, a density of about 0.96 gram per milliliter and which has about 1.5 double bonds per hundred carbon atoms, is treated with $50 \times 10^{-6}$ roentgens of $\beta$-radiation. To the thus irradiated polymer is added 0.005 percent of 6-($\alpha$-methylbenzyl)-o-cresol and the resulting product has better stability characteristics.

EXAMPLE XXIII

Two parts of 6-($\alpha,\alpha$-dimethylbenzyl)-o-cresol are added with milling to 100 parts of a low density polyethylene prepared by high pressure polymerization and which has an average molecular weight of 18,000 to 20,000. The resulting product is vastly improved in its oxidative stability.

EXAMPLE XXIV

To 10,000 parts of a polyethylene having an average molecular weight of about 100,000 and which has a tensile strength of 5400 p.s.i., a Shore D hardness of 70 and a softening temperature of 130° C. under low load, is added 10 parts of 2,6-bis($\alpha$-methylbenzyl)phenol to prepart a composition of outstanding oxidative stability.

Liquid hydrocarbon fuels employed in the operation of spark ignition combustion engines are also vastly improved in their storage stablity by the practice of this invention. Table I, below, gives the compositions of a number of typical commercial gasolines which may be stabilized against oxidative deterioration by the inclusion therein of a compound of this invention.

*Table I*

GASOLINE COMPOSITIONS

| Gasoline | Percent aromatics | Percent olefins | Percent saturates | Gravity °API |
|---|---|---|---|---|
| A | 26.6 | 20.8 | 52.6 | 62.1 |
| B | 8.6 | 7.9 | 83.5 | 68.5 |
| C | 20.0 | 41.2 | 38.8 | 62.9 |
| D | 20.5 | 32.9 | 46.6 | 63.5 |
| E | 38.1 | 7.3 | 54.6 | 59.3 |

EXAMPLE XXV

To 1,000 parts of Gasoline A, as described in Table I, is added 10 parts of 6-($\alpha,\alpha$-dimethylbenzyl)-o-cresol.

EXAMPLE XXVI

To 10,000 parts of Gasoline B is added 500 parts of 6-($\alpha$-methylbenzyl)-o-cresol.

EXAMPLE XXVII

To 10,000 parts of Gasoline C is added 1 part of 2,6-bis($\alpha,\alpha$-dimethylbenzyl)phenol.

Most gasolines in commercial use also contain an organometallic antiknock agent and certain scavengers therefor. The antiknock agent most frequently employed is tetraethyllead. The scavengers are ordinarily halohydrocarbon compounds of chlorine and bromine. Most widely used of these are ethylene dibromide and ethylene dichloride. In addition, gasolines often contain other additives such as dyes and phosphorus containing corrective agents. These gasoline compositions containing additives are also protected against oxidative deterioration by the practice of this invention as demonstrated by the following examples.

EXAMPLE XXVIII

To 10,000 parts of Gasoline D, which contains 2.39 g./gal. of tetraethyllead and 1 theory of bromine as ethylene dibromide, is added 100 parts of 2,6-di-($\alpha,\alpha$-diisopropylbenzyl)phenol.

EXAMPLE XIX

To 1,000 parts of Gasoline E, which contains 2.47 g./gal. of lead as tetraethyllead, 1 theory of chlorine as ethylene dichloride, 0.5 theory of bromine as ethylene dibromide and 0.2 theory of phosphorus as tris($\beta$-chloroisopropyl)thionophosphate, is added 5 parts of 6-($\alpha$-ethyl-$\alpha$-propyl-p-nonylbenzyl)-o-cresol.

The tetraethyllead antiknock additive is supplied to oil companies as a mixture already containing the necessary dyes and scavengers. These mixtures, which are commonly known as antiknock fluid compositions, are also protected against oxidative deterioration by the practice of this invention.

EXAMPLE XXX

To an antiknock fluid composition which is to be used as an additive to gasoline and which contains 61.5 parts of tetraethyllead, 17.9 parts of ethylene dibromide and 18.8 parts of ethylene dichloride is added with agitation 1.3 parts of 2,6-bis($\alpha$-methylbenzyl)phenol. The resulting composition is stable for long periods when exposed to air.

EXAMPLE XXXI

To 1,000 parts of commercially available diesel fuel having an octane number of 51.7 and a 50 percent evaporation temperature of 509° F. is added 3 parts of 6-($\alpha$-methylbenzyl)-o-cresol. The resulting fuel is stable to oxidative deterioration.

The compounds of this invention are also useful in preventing oxidative deterioration in lubricating oil compositions. Thus, an embodiment of this invention is a lubricating oil normally susceptible to oxidative deterioration containing a small antioxidant quantity, up to 5 percent, of a compound of this invention as defined above.

To prepare the lubricants of this invention, an appropriate quantity—from about 0.001 to about 5 percent and preferably from about 0.25 to about 2 percent—of the compound of this invention is blended with the base oil to be protected. Suitable base oils include mineral oils and also synthetic diester oils, such as sebacates, adipates, etc. which find particular use as aircraft instrument oils, hydraulic and damping fluids and precision bearing lubricants. All of these base oils are normally susceptible to oxidative deterioration, especially at elevated temperatures.

The finished lubricants of this invention have much greater oxidation stablity and many other improved performance characteristics as compared with the corresponding base oils.

The following examples illustrate the preferred lubricating oil compositions of this invention.

EXAMPLE XXXII

To 1,000 parts of a solvent refined neutral oil (95 VI and 200 SUS at 100° F.) containing 6 perecent of a commercial methacrylate type VI approver which gives the finished formulation of a VI of 140 and a viscosity of 300 SUS at 100° F. is added 5 percent of 6-($\alpha,\alpha$-dimethylbenzyl)-o-cresol.

EXAMPLE XXXIII

To an additive-free solvent refined crankcase lubricating oil having a viscosity index of 95 and an SAE viscosity of 10 is added 0.001 percent of 2,6-bis($\alpha,\alpha$-dimethylbenzyl)phenol.

EXAMPLE XXXIV

To 100,000 parts of a petroleum hydrocarbon oil having a gravity of 30.3° API at 60° F., a viscosity of 178.8 SUS at 100° F., a viscosity index of 154.2 and which contains 0.2 percent sulfur, is added 200 parts of 2-($\alpha,\alpha$-diethyl-p-methylbenzyl)-6-tert-butylphenol. The resulting oil possesses greatly enhanced resistance to oxidative deterioration.

EXAMPLE XXXV

To 100,000 parts of a commercially available pentaerythritol ester having a viscosity at 100° F. of 22.4 centistokes, and known in the trade as "Hercoflex 600" is added 400 parts (0.4 percent) of 2,6-bis(α-methylbenzyl)phenol. The resulting finished oil possesses markedly improved resistance against oxidative deterioration.

EXAMPLE XXXVI

To 100,000 parts of dioctyl sebacate having a viscosity of 210° F. of 36.7 SUS, a viscosity index of 159 and a molecular weight of 426.7 is added 250 parts (0.25 percent) of 6-(α-methylbenzyl)-o-cresol.

To illustrate the benefits obtained by the practice of this invention, a standard oil oxidation test is used. The equipment and test procedure described by Kroger et al., Erdol and Kohle, 2, page 398 (1949), served as a basis for the tests. The equipment and procedures are slightly modified in order to make the oxidizing conditions more strenuous. In this manner the test lubricants are subjected to severe oxidizing conditions in order to conclusively establish the effectiveness of additives under very adverse conditions. Furthermore, the modifications are found to provide results which correlated extremely well with test results of other standard procedures, including actual engine tests.

The equipment consists of a reaction cell connected with an open end manometer whereby the total uptake of oxygen by the oil is determined by noting the drop in height of the mercury in the manometer. The test oil sample is placed in the reaction cell which is then flushed with oxygen and the temperature is then raised and held at that selected for the test until the substrate oil undergoes catastrophic oxidation which is shown by a rapid oxygen uptake. In all cases, the test oil is deliberately contaminated with iron hexoate as an oxidation promoter. In tests of this nature, the oxidation, stability of a test lubricant is determined by measuring its induction period, that is, the time required for catastrophic deterioration under the above outline conditions. The longer the induction period, the more stable the lubricant. In tests of this nature lubricants containing an additive of this invention give excellent results.

The compounds of this invention are also useful as intermediates in the preparation of a new class of compounds. Thus, by reacting the compounds of this invention with a sulfur chloride, either sulfur monochloride or sulfur dichloride, novel sulfur bridged compounds are prepared which are useful as antioxidants in a wide variety of organic material, including polyethylene, polypropylene, rubber, gasoline, lubricating oil, and the like. The preparation of such a sulfur bridged compound can be illustrated by the following example.

EXAMPLE XXXVII

A reaction vessel equipped with heating means, reflux condenser and means for charging gaseous and liquid reactants was flushed with nitrogen and charged with 60.4 parts of 2,6-bis(α-methylbenzyl)phenol dissolved in 132 parts of hexane. Sulfur dichloride 11.3 parts dissolved in 66 parts of hexane was added to the phenolic solution with stirring over a 3½ hour period. The mixture was then heated slowly to reflux, reflux being obtained in 2½ hours. The mixture was then cooled and water washed several times with dilute caustic followed by a dilute acid wash. The solvent (hexane) and reactant [2,6-bis(α-methylbenzyl)phenol] were then removed by vacuum distillation leaving a good yield of 4,4'-thiobis[2,6-di-(α-methylbenzyl)phenol] as a glassy solid.

We claim:

1. A compound having the formula:

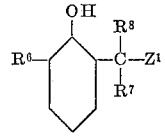

where $R^6$ is an alkyl radical having from 3 to about 8 carbon atoms, $R^7$ is an alkyl radical having from 1–3 carbon atoms, $R^8$ is selected from the class consisting of hydrogen and alkyl radicals having from 1–3 carbon atoms and $Z^1$ is an aromatic hydrocarbon radical having from 6 to about 12 carbon atoms and is selected from the class consisting of phenyl, alkyl substituted phenyl and phenyl substituted phenyl radicals.

2. The compound of claim 1 where the $R^6$ is a tertiary butyl radical.
3. 6-(α,α-dimethylbenzyl)-o-cresol.
4. 2-(α-methylbenzyl)-6-tert-butylphenol.
5. 2-(α,α-dimethylbenzyl)-6-tert-butylphenol.

References Cited by the Examiner

UNITED STATES PATENTS

| | | | |
|---|---|---|---|
| 1,580,053 | 4/1926 | Kropp et al. | 260—619 |
| 1,951,206 | 3/1934 | Rather et al. | 44—78 |
| 2,028,043 | 1/1936 | Britton et al. | 260—619 |
| 2,247,402 | 7/1941 | Perkins et al. | 260—619 |
| 2,394,754 | 2/1946 | D'Alelio | 260—619 |
| 2,831,898 | 4/1958 | Ecke et al. | 260—619 X |
| 2,836,568 | 5/1958 | Ecke et al. | 252—386 |
| 2,923,745 | 2/1960 | Buls et al. | 260—619 X |
| 2,980,520 | 4/1961 | Thayer | 44—72 X |
| 3,048,563 | 8/1962 | Seydel et al. | 260—619 |

LEON ZITVER, *Primary Examiner.*

H. G. MOORE, *Examiner.*

D. M. HELFER, *Assistant Examiner.*